June 4, 1968  SUSUMU KATAYAMA  3,386,250
WATER CURRENT CONTROLLING MEANS
Filed Dec. 1, 1964  2 Sheets-Sheet 1
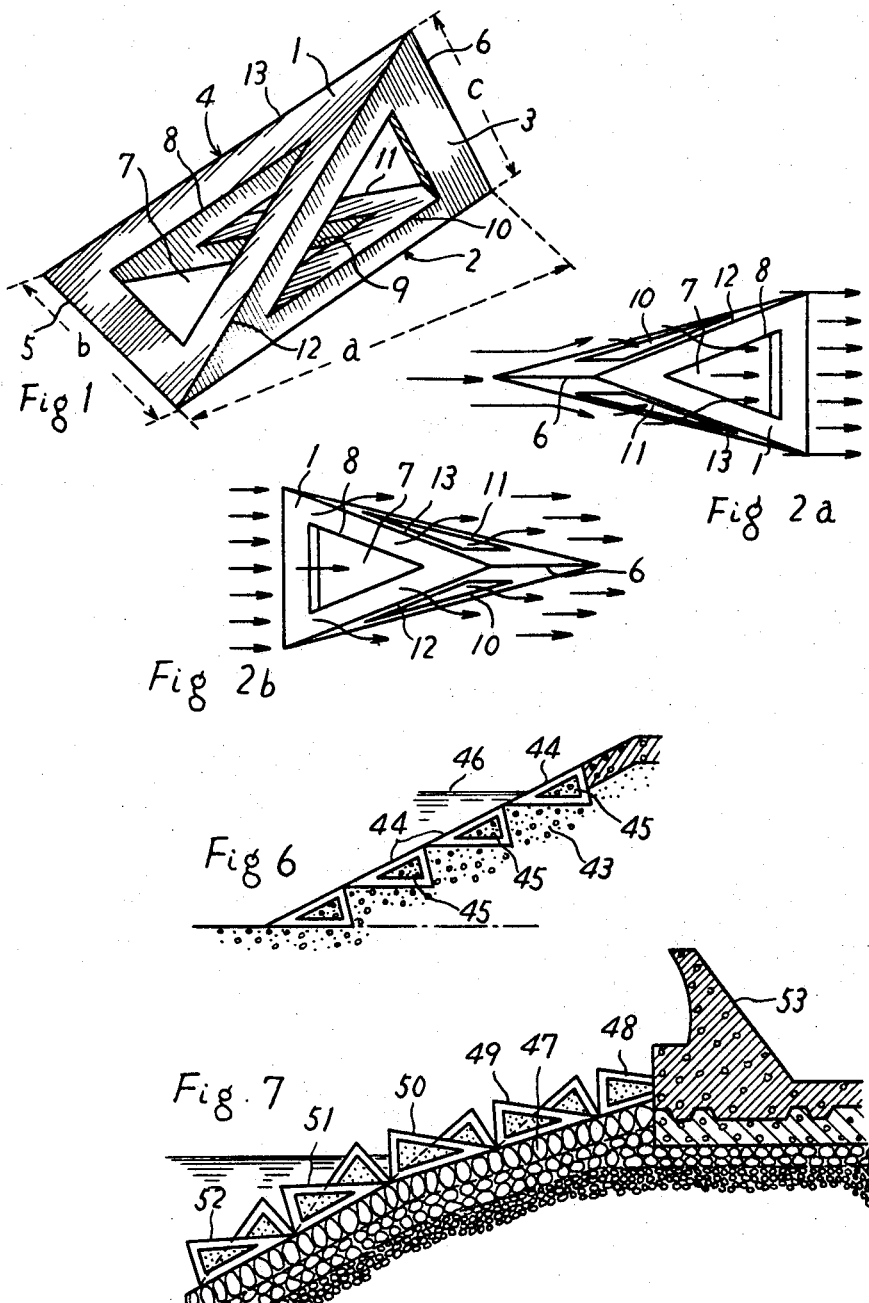
INVENTOR.
SUSUMU KATAYAMA
BY
ATTORNEY

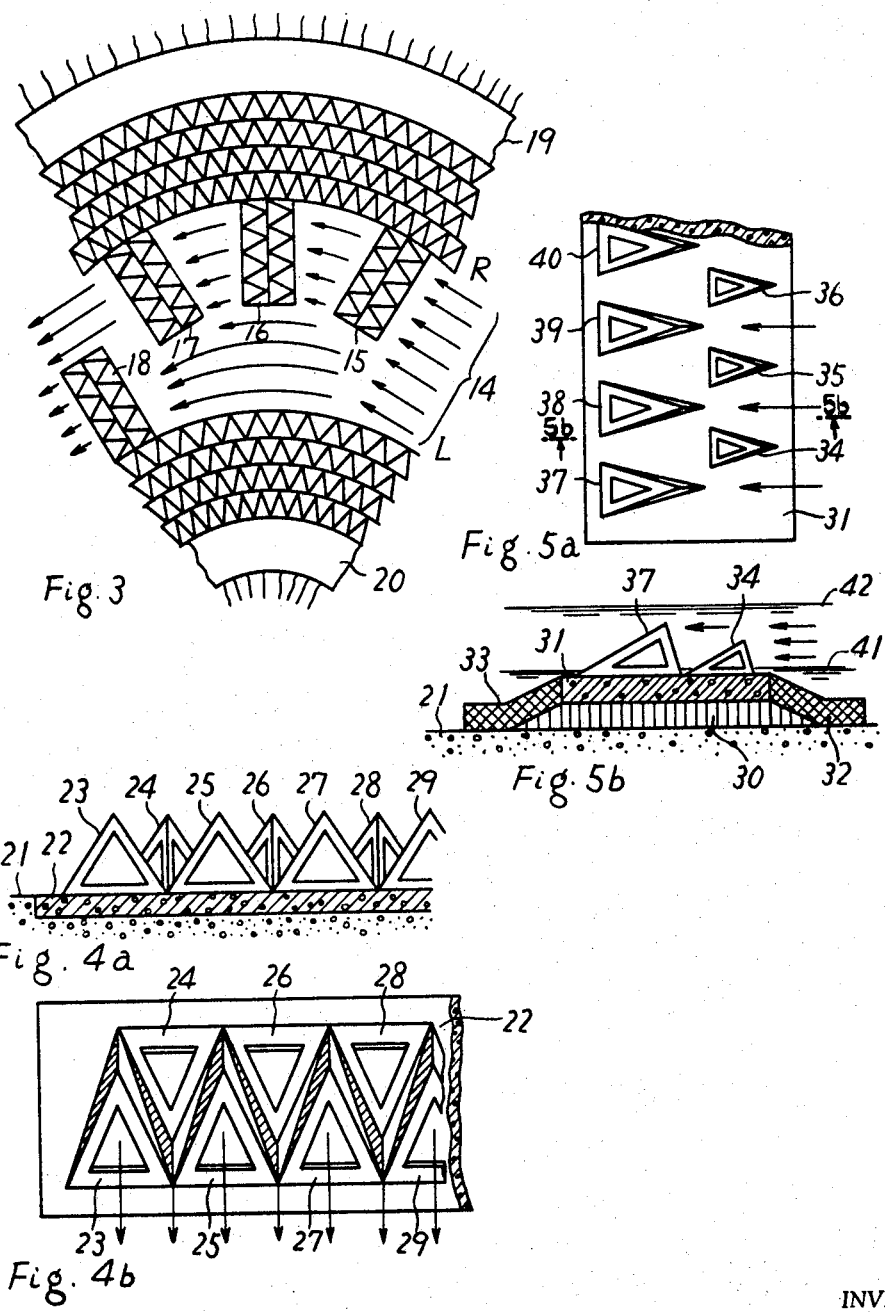

United States Patent Office 3,386,250
Patented June 4, 1968

3,386,250
WATER CURRENT CONTROLLING MEANS
Susumu Katayama, 1404 Kitashinchi, Kagami-cho,
Kumanoto-ku, Yatsushiro-gun, Japan
Filed Dec. 1, 1964, Ser. No. 415,084
Claims priority, application Japan, Dec. 7, 1963,
38/65,530
10 Claims. (Cl. 61—3)

This invention relates to water current controlling means and more specifically to novel and improved four sided hollow blocks and arrangements of blocks for controlling the direction and speed of water in rivers and streams and the absorption of wave energy on shores to minimize and prevent erosion. Each side wall of the block in accordance with the invention being essentially in the form of an isosceles triangle having an altitude greater than the length of the base.

One object of the invention resides in the provision of water current control means to equalize water currents and control the direction of the flow to reduce eddy currents and turbulence and thereby minimize resultant erosion. It is well recognized that river currents when moving about a curved portion of the bed and particularly at the time of a flood will gouge out the outer bank to a substantial extent and will deposit sand and silt on the inner side of the river bottom. Because of this phenomenon, the curve in the river becomes greater and greater and known means for projecting the bank of the river will usually become eroded and finally collapse. The reason for the failure of known devices is that the water flow between the upper and lower portions of the river differs in velocity with the high velocity upper layers impinging upon the outer side of the curve, whereupon the velocity is reduced and the water then flows downward along the outer bank at a lower velocity and joins the lower velocity water permitting deposits adjoining the inner bank. With this invention, the speed of the water current colliding with the bank of the river is reduced, and the water currents are directed downstream in substantially parallel arrangement, thus greatly reducing erosion.

Another object of the invention is to provide a novel and improved block which may be used alone or in combination with similar blocks to control water current and direction. This is attained by the utilization of a block of improved configuration and light weight which may be firmly anchored within a river or on the shore. By reason of the improved configuration and characteristics of the individual blocks, groups of them are easily mounted and do not require substantial understructures in order to support them in the desired position. In this way, water current is directed in a controlled path and at a reduced velocity with the result that erosion is substantially minimized if not prevented, and the deposition of sand and silt on the bottom does not occur in selected areas but rather is distributed uniformly throughout the river bed.

Another object of the invention resides in novel and improved means for absorbing energy from waves in order to protect ocean shores. In the past, a so-called tetrapod which is a four legged structure formed of concrete has been used. Such a device has not been found satisfactory since the reduction in water current is so great that sand tends to accumulate about the tetrapod and ultimately bury it. Moreover, the use of a plurality of tetrapods requires extremely large quantities of concrete material. With this invention, the novel and improved blocks and the arrangements of blocks require a minimum amount of concrete and greatly minimize sand accumulation which would tend to bury them.

A still further object of the invention resides in the provision of novel and improved water current controlling blocks arranged on the banks of seashores, river banks, dams and the like, which can be positioned in such a manner that the blocks may be firmly supported by the inclined bank and will not slip or be easily disturbed. This arrangement overcomes the difficulties encountered with prior devices which were easily undetermined with the result that the structures soon collapsed.

The above and other objects and advantages of this invention will become more apparent from the following description and accompanying drawings forming part of this application.

In the drawings:

FIGURE 1 is a perspective view of a current control block in accordance with the invention.

FIGURE 2a is a plan view of a block as shown in FIGURE 1 and illustrating the manner in which water current direction is controlled when flowing about the block in one direction.

FIGURE 2b is a plan view of a block similar to that shown in FIGURE 2a but illustrating the water current control characteristics of the block with water flowing in the other direction.

FIGURE 3 is a diagrammatic plan view of a water current control and bank protection structure in accordance with the invention.

FIGURE 4a is a side elevational view of the water controlling structure in accordance with the invention and utilizing a plurality of blocks as shown in FIGURE 1.

FIGURE 4b is a plan view of the structure shown in FIGURE 4a.

FIG. 5a is a plan view of another arrangement of water control blocks in accordance with the invention.

FIGURE 5b is a cross-sectional view of FIGURE 5a taken along the lines 5b—5b thereof.

FIGURE 6 is a cross-sectional view of an inclined bank protecting structure in accordance with the invention.

FIGURE 7 is a cross-sectional view of an arrangement of blocks in accordance with the invention on a seashore for absorbing wave energy.

One form of block in accordance with the invention comprises essentially a body having top and bottom walls and two side walls and wherein all of the four walls are in the form of isosceles triangles giving the resultant structure the appearance of a triangular pyramid in which two inclined edges of the pyramid are equal and substantially greater in length than the third inclined edge. The block is hollow, and each of the four sides of the blocks contains an opening generally triangular in configuration and communicating with the interior of the block. The ratio of the height of each isosceles triangle to the base is greater than one and it is preferable to employ a ratio of the height to the length of the base of the order of 1.5:1 to 2:1. Furthermore, the common edge of the side walls preferably should not exceed the length of the edge which is common to the top and bottom walls.

Referring now to the drawings and more specifically to FIGURE 1, there is illustrated a preferred embodiment of the invention. As will be observed, the block comprises a four-sided solid having top and bottom walls and two side walls. The top wall is denoted by the numeral 1 while the bottom wall is denoted by the numeral 2, and these walls are in the shape of isosceles triangles. The side walls 3 and 4 are also in the form of isosceles triangles. The top and bottom walls 1 and 2 are preferably similar in shape and size, and the height of each face, denoted by the letter $a$, with reference to the bottom wall 2 should be equal to or greater than the length of the base $b$ which is common to the top and bottom walls 1 and 2 and may be of the order of one to five times the length of the base. In the preferred embodiment of the invention, the height of the walls 1 and 2 should preferably be one and one-half to two times the length $b$ of the base. It is also preferred that the base 6 which is common to the side walls 3 and 4 have a length c not greater than the length b of the base 5 which is common to the upper and lower walls 1 and 2 respectively. The interior of the block has an open cavity 7 therein and each of the walls 1 through 4 has triangular openings or windows 8 through 11 respectively communicating with the cavity 7.

The function of the block in reducing the velocity and controlling the direction of water flow is illustrated in FIGURES 2a and 2b. In FIGURE 2a, let it be assumed that the water current impinges on the base 6 which is common to the side walls 3 and 4. The water divides about the base 6 and part of it flows through the windows 10 and 11. Since the cross-sectional area of the space 7 is larger than the effective areas of the openings 10 and 11 with reference to the water current, the speed of the water flowing through the space 7 and emerging from the opening 8 is therefore decreased. The water which flows over the wall 1 after crossing the edges 12 and 13 joins with the water emerging from the window 8, but, as the inclination of the wall 1 is relatively small, the velocity of the water is not materially increased with the result that eddy currents are reduced, and there is insufficient force to erode the surface forwardly of the current control block. In the case of a river bottom where a plurality of blocks are utilized, erosion is substantially minimized since the velocity of the water is not only decreased but the water leaves the block with all portions flowing in substantially parallel directions.

The effect described above also obtains when the block is placed in a reversed position as shown in FIGURE 2b. In this case, the water impinges on the sloping top wall 1 and a portion of the water enters the space 7 through the opening 8. In addition, a portion of the water will flow over the edges 12 and 13 of block travel and along the walls 3 and 4. Here again, the water emerging from the openings 10 and 11 will be materially reduced in velocity and joins the water which flows over the walls 12 and 13. Thus, a reduction in velocity is attained and all portions of the water leave the block in essentially parallel directions, again preventing turbulence and eddy currents which cause severe damage to banks, river bottoms and the like.

FIGURE 3 illustrates a novel and improved arrangement of current controlling blocks as shown in FIGURE 1 for controlling water current in the curve of a river. The water current is denoted by the arrows 14, the outer bank of the river by the numeral 19, and the inner bank by the numeral 20. Normally, the water 14 is approaching a curve such as illustrated in FIGURE 3 will tend to impinge upon the right bank R (19) of the river with the result that it is subjected to substantial erosion. In addition, piles of sand and silt will normally accumulate at the left bank L (20). As a result, the position of the river generally shifts in the direction of the bank 19. This natural phenomenon can be materially retarded, if not prevented, by the utilization of current control structures 15, 16 and 17 adjoining the right bank and 18 adjoining the left bank. In addition, similar current control structures may be applied to the banks themselves as illustrated diagrammatically by the zigzag lines. As pointed out in connection with FIGURES 2a and 2b, the novel and improved blocks in accordance with the invention will function to decrease the velocity of the water and at the same time reduce turbulence and eddy currents so that, as the water is intercepted by the structures 15, 16 and 17, the velocity and turbulence are reduced and the water is prevented from eroding the bottom. Since the water after rounding the curve would normally tend to be deflected toward the left bank, that water which is so deflected is again controlled and decelerated by the structure 18. At the same time, the banks of the river are protected by similar water control structures as will be described hereinafter.

The structures 15 through 18 are shown in detail in FIGURES 4a and 4b. Each structure comprises a concrete base 22 positioned in the bed 21 of the river. A plurality of blocks 23 through 29 are affixed to the upper surface of the concrete base 22 in substantially linear alignment. Each block is contiguous with its adjoining block and is reversed in position to produce in effect a zigzag line defining the edges of adjoining blocks. In the embodiment of the invention illustrated in FIGURE 3, two sets of blocks form each of the structures 15 through 18. In addition, the blocks may be set in a similar configuration about the banks of the river, or may be arranged in the manner to be described in connection with FIGURE 6.

In certain cases, it may be desirable to direct the flow of water in a river so that when the water level is low substantially all of the water is caused to flow about the inner side of the curve, while at the time of a high water level, the water is caused to flow throughout the entire width of the river bed in which case sand and slit will be collected on the river bottom near the outer edge of the curve. In such a case, the structures 15 through 17 as shown in FIGURE 3 would be spaced substantially from the river bottom, while the structure 18 would remain on the river bottom. The structures 15 through 17 would preferably be formed in the manner illustrated in FIGURES 5a and 5b. For this purpose, a wooden bed 30 is placed on the river bottom and a concrete base 31 placed theron. The leading and trailing edges of the concrete base 31 are provided with inclined fagots 32 and 33 which slope essentially from the bed 21 of the river to the upper surface of the concrete base 31. The top surface of the base 31 may be provided with a line of relatively small blocks 34, 35, 36, etc. and a line of relatively large blocks 37 through 40. With this arrangement and when the water level is at a height denoted by the line 41, the water will flow very slowly over the bed 31 and therefore the current is deflected essentially about the inner side of the curve of the river. When the water level attains the level 42, for example, the water passes over the bed 31 and the curent is controlled by blocks 34 through 40. The small blocks 34 through 36 etc. work effectively at the time that the water level is relatively low and the top portions of the blocks extend above the water level. The larger blocks 37 through 40 effectively control the current when the water level is higher.

The bank-protecting structures 19 and 20 of FIGURE 3 may be formed in the manner illustrated in FIGURE 6. The lower portion of the bank is preferably covered with a layer of sand 43, and the blocks 44, such as those illustrated in FIGURE 1, are placed on the sand and arranged in an alternating fashion as shown in FIGURES 4a and 4b. The bottom walls of the blocks 44 are disposed in horizontal positions as illustrated, and the cavities of the blocks are preferably filled with a mixture of stones and sand 45. The upper edge of the bank is preferably provided with a layer of concrete. With this arrangement, the upper wall 1 of the blocks as shown in FIGURE 1 actually constitutes the slope of the bank. Since the bottom wall 2 of the blocks is in a horizontal position on the sand 43, the blocks will not slip downwardly along the slope and are therefore securely supported. Even in the event that the sand 43 should settle as the water level 46 lowers, the blocks 44 will settle accordingly but will always be firmly seated on the sand 43. With prior known structure, such as the utilization of concrete for covering the surface of a bank, should the bank be eroded from beneath the concrete layer, the latter will settle and be destroyed by the water pressure.

The blocks in accordance with the invention may also be utilized for absorbing wave energy along seashores, and a suitable structure for this purpose is illustrated in FIGURE 7. In this figure, the numeral 47 denotes a shore bed formed of stone. A first line of blocks 48 through 52 is secured to the stone bed so that the base portion of each block common to the two side walls is directed outwardly. The next line of blocks adjoins the first line but is reversed in position as illustrated in FIGURE 7, and this arrangement is continued to cover the entire area to be protected. Stones and sand may be packed within the interior of the blocks, if desired, and a concrete abutment 53 may be employed to intercept any water which may flow beyond the current controlling structure. In this way, substantial energy is removed from the waves striking the shore and erosion is eliminated.

While only certain embodiments of the invention have been illustrated and described, it is apparent that alterations, modifications and changes may be made without departing from the true scope and spirit thereof as defined by the appended claims.

What is claimed is:

1. A water current control block comprising a four sided hollow body, each of said sides being in the shape of an isosceles triangle and having an opening communicating with the interior of said body the distance between the base of at least one triangular side and the opposite apex is greater than the length of said base.

2. A water current control block according to claim 1 wherein the ratio of the distance between the base of each triangular side and the opposite apex to the length of the base is between 1.5:1 and 2:1.

3. A water current control block according to claim 1 wherein the ratio of the length of a base common to one pair of opposing triangular sides to the length of the base common to the other pair of triangular sides is not greater than 1.

4. A water current control structure comprising a plurality of current control blocks according to claim 1 fixedly positioned in a moving stream of water, each of said blocks having top, bottom and two side walls and positioned in said stream with their base edges common to said side walls directed upstream.

5. A water current control structure comprising a plurality of current control blocks according to claim 1 fixedly positioned in a moving stream of water, each of said blocks having top, bottom and two side walls with each wall being in the form of an isosceles triangle and positioned in said stream with their base edges common to said side walls directed downstream.

6. A water current control structure comprising a plurality of current control blocks according to claim 1 placed in side-by-side relationship, each of said blocks having top, bottom and two side walls with each wall being in the form of an isosceles triangle, alternate blocks being inverted relative to the adjoining blocks so that the top walls of adjoining blocks slope in opposite directions.

7. A water current control structure comprising a plurality of rows of current control blocks according to claim 1, each of said blocks having top, bottom and two side walls with each wall being in the form of an isosceles triangle, the blocks of each row being substantially uniform in size and the blocks of at least two rows differing in size.

8. A water current control structure comprising a plurality of current control blocks according to claim 1 arranged in spaced relationship to the bottom of a water course, each of said blocks having top, bottom and two side walls with each wall being in the form of an isosceles triangle.

9. A water control structure for the banks of rivers and other bodies of water comprising a plurality of current control blocks according to claim 1 arranged on said banks, each of said blocks having top, bottom and two side walls with each wall being in the form of an isosceles triangle, the bottom walls of said blocks being horizontally disposed with each block being in contiguous relationship with adjoining blocks.

10. A water control structure for banks of rivers and other bodies of water comprising a plurality of current control blocks according to claim 1 arranged on said banks, each of said blocks having top, bottom, and two side walls with each wall being in the form of an isosceles triangle, said blocks being disposed in rows following the shore line with each successive row from the shore line being substantially contiguous with the proceeding row and with alternate blocks of each row being reversed relative with the adjoining blocks of said row.

References Cited

UNITED STATES PATENTS

| | | | |
|---|---|---|---|
| 1,875,668 | 9/1932 | Sheldon | 61—3 |
| 2,068,537 | 1/1937 | Dorn | 61—3 |
| 2,344,302 | 3/1944 | Harza | 61—37 |
| 2,835,112 | 5/1958 | Monnet | 61—3 |

FOREIGN PATENTS

| | | |
|---|---|---|
| 179,836 | 1/1907 | Germany. |
| 228,336 | 5/1960 | Australia. |
| 850,135 | 9/1960 | Great Britain. |

EARL J. WITMER, *Primary Examiner.*